Patented Apr. 3, 1934

1,953,694

UNITED STATES PATENT OFFICE 1,953,694

PROCESS FOR PREPARING GLUCONIC ACID

Teizo Takahashi, Hongo-ku, Tokyo-shi, Japan

No Drawing. Application June 6, 1930, Serial No. 459,614. In Japan July 19, 1929

5 Claims. (Cl. 260—120)

This invention relates to most economical and efficient method for preparing gluconic acid.

The method is characterized by fermentation processes, which are described in detail as follows:

1. By fermenting fresh or dried fruits, such as persimmon, with water; either with water alone, or in presence of calcium carbonate;
2. By fermenting Laminaria ("Kombu", a kind of algæ) with water alone, in the presence of calcium carbonate;
3. By fermenting sugars, polyhydric alcohols, for instance, mannite, with acetic acid bacteria isolated from the above materials, alone, or with the addition of calcium carbonate;
4. As mentioned in the third case, but with the addition of yeast water, extracts of soy-beans or rice bran, or with the further addition of other inorganic and organic nutrients.

Gluconic acid has been mainly prepared by oxidation of glucose. But as the result of using costly materials such as bromine, chlorine, etc., the prepared goods are too costly. Likewise, although the production of gluconic acid from glucose by acetic acid bacteria is a widely known fact, yet because of its small yield it also has been disregarded for industrial purposes.

The bacteria already known to produce gluconic acid, are chiefly as follows: *Bact. industrium, Bact. oxydans, Bact. acetosum, Bact. aceti, Bact. acetigenum, Thermobacter aceti* and *Bact. xylinum.*

The common yield of the acid attains only 15–20% of glucose, and so even in the most favorable case with *Bact. industrium*, a yield of more than 70% could not be expected.

Most recently S. Hermann (Biochemische Zeitschrift Band 205, Heft 4–6, pp. 297–305, 1929) has isolated a new bacterium from algæ tea, "Kombucha", a special kind of tea prepared from *Laminaria algæ.* This bacterium changes about 80% of glucose into gluconic acid.

A process for the preparation of gluconic acid by microorganism has already been offered by Boutroux in 1880. He used *Mycoderma aceti*, cultivating it in yeast water containing calcium carbonate.

In my case, I obtained from fermented dried persimmon ("Hoshigaki"), in the presence of water at 28–30° C., four new acetic bacteria. All these bacteria have the property of producing much gluconic acid from glucose. Two of them have great power to produce gluconic acid; 98–100% yield of the acid is obtained within one or two weeks' cultivation.

The morphological and physiological properties of them are given below:

1. Bact. Hoshigaki var. rosea

This species is a short rod-shaped and non-motile bacterium. The cells occur generally single, are frequently connected in pairs, and seldom occur in chain form. The size is $0.7$–$0.9\mu \times 0.7$–$1.8\mu$, the majority of cells measuring $0.7\mu \times 1.5\mu$. Involution forms are abundant, occurring generally as long, sometimes swollen threads. Yeast-like cells are seldom found. The film is very thin and delicate, but soon it sinks down as a powder and no further reformation is perceived. Some parts of the film form a bacterial ring along the wall of the vessel on the surface of the liquid which creeps up to an extraordinary height. The film gives neither starch nor cellulose reaction. The liquid turns turbid. The optimum temperature for growth is 30–35° C.

At 26–28° C. the maximum amount of gluconic acid is attained in ten days (in 10% glucose solution 11.5% of gluconic acid is formed), after which the amount of acid formed beforehand does not decrease. If the concentration of glucose in the medium is prepared to be 20%, the acid production increases to 17.2%. This species produces acids from arabinose, glucose, fructose, galactose, ethyl alcohol, propyl alcohol, glycerin and mannite, but not from saccharose, maltose, lactose, raffinose, dextrin, starch, inulin, and sorbite. It resists alcohol up to 6–7% (by weight) and the maximum production of acetic acid from alcohol is 1.87%.

This species produces red pigment in beer-wort, Japanese rice wine ("Sake" in Japanese), and any culture medium containing calcium carbonate.

This is a new species and I propose the name *Bact. Hoshigaki* var. *rosea* for it.

2. Bact. industrium var. Hoshigaki

This bacterium is short, rod-shaped, and motile. The cells occur generally in single, and often connected pairs or as chains. The size is $0.5$–$1.5\mu \times 0.8$–$3.0\mu$, the majority of cells measuring $1.0\mu \times 3.0\mu$. Involution forms of long swollen threads are abundant, and frequently yeast-like cells are observed. The film is uniform and thin, creeps up the wall of the vessel somewhat, and is inseparable. It gives no reaction for starch or cellulose. The culture fluid turns turbid.

The optimum temperature for the growth is 25–28° C., and the same for the acid formation is 24–25° C.

The maximum point of gluconic acid formation is reached in four days at 24–25° C. amounting to 9.95% in a glucose solution of 10%, and to 10.38% in six days. In a glucose solution of 35%, the gluconic acid production increases to such a concentration as 19.9% of the acid. This species produces acids from arabinose, glucose, fructose, saccharose, maltose, raffinose, dextrin, inulin, glycol, glycerin, mannite, sorbite, ethyl alcohol and propyl alcohol, but not from methyl alcohol. It resists alcohol up to 8–10% (by weight) as the highest limit and the maximum production of acetic acid from alcohol is 1.35%. It does not coagulate the dextrin in the solution. It is a new species, and the name *Bact. industrium* var. *Hoshigaki* is proposed for it.

By fermenting a mere mixture of chopped dried persimmon and water, 50% sugar, contained in the former, changes into gluconic acid. As mentioned above, these bacteria have the ability to ferment not only glucose but also mannite. These two substances are found in dried persimmon as the most common components, which are utilized completely by these microorganisms. Further, a still higher yield of the acid may be expected if the pure culture of the bacteria, mentioned above, is applied.

The carbohydrates including the sugars present in the persimmon are hydrolized during fermentation and such hydrolysis will produce glucose or mannite, and at least a portion of the glucose will be reduced to mannite or, as it is also known, mannitol.

On introducing a very small quantity of dried persimmon into glucose or saccharose solution and allowing it to ferment at 25–30° C., we may expect an economical utilization of the bacteria natural to dried persimmon.

From the above described facts it is evident that my method of gluconic acid preparation is quite different from the Boutroux process. It differs as follows:

1. My process does not necessarily use yeast water;
2. The utilization of dried persimmon or other dried and fresh fruits or extracts of soy-beans or rice-bran was not attempted in Boutroux's process;
3. In my process the utilization of dried persimmon or other dried and fresh fruits is a fundamental idea;
4. In my case, besides glucose, saccharose, invert sugar, maltose or mannite are utilized for the said production, which was not attempted in Boutroux's process.

The following table shows examples of the gluconic acid production from saccharose, maltose and mannite:

| | Concentration % | c. c. of culture liquid | n NaOH/10 required for the neutralization of acid c. c. | Gluconic acid % |
| --- | --- | --- | --- | --- |
| Saccharose | 2 | 10 | 1.8 | 27 |
| Maltose | 2 | 10 | 1.3 | 12 |
| Mannite | 2 | ~10 | 3.0 | 34 |

Still higher yield may be expected, if we increase the concentration of sugars in the culture fluid.

5. In my process the material cost is easily lowered by decreasing the quantity of dried persimmon, which may be replaced by sugars or polyhydric-alcohols.

Moreover, the acid production is carried on without the addition of calcium carbonate, which was necessarily used in Boutroux's process;

6. As a result of the fifth case, free acid is obtained as the product, which was found as salt in Boutroux's process;

7. In Boutroux's process, *Mycoderma aceti* was used, but quite different bacteria (new species) are used in mine.

A few other examples of the process are given below:

1. By inoculating 100 c. c. of extract obtained from 5 gr. of chopped dried persimmon with a pure culture of *Bact. Hoshigaki* var. *rosea*, with the addition of 8 gr. glucose, and afterward fermenting during 13 days at 25° C., 93% gluconic acid was obtained as the yield.

2. By adding 100 c. c. of water to 10 gr. chopped persimmon and fermenting the mixture during 10 days at 25° C., there was obtained 50% of gluconic acid as the yield.

3. 100 c. c. of yeast water (the extract of 50 gr. yeast in 1000 c. c. of water) containing 10 gr. glucose were inoculated with *Bact. industrium* var. *Hoshigaki*, and after 4 days' incubation at 25° C., 90% of glucose was changed into gluconic acid.

4. To 100 c. c. of soy-bean extract (70 gr. soybeans extracted with 1000 c. c. of water) were added 10 gr. of glucose and incubated after inoculation with *Bact. Hoshigaki* var. *rosea* for 18 days at 26–28° C.; 103% of gluconic acid to total glucose was found.

5. 100 c. c of rice-bran extract (400 gr. rice-bran extracted with 800 c. c. of water) containing 10 gr. glucose, were inoculated with *Bact. Hoshigaki* var. *rosea* and fermented during 18 days at 26–28° C.; 85% of gluconic acid was obtained.

From the above described facts it may be seen that my process is the most excellent process for gluconic acid preparation.

The cost may not exceed over twenty cents per 100 gr. acid.

The process of utilizing dried or fresh fruits or acetic acid bacteria isolated from above materials for the production of gluconic acid has never before been attempted.

Having now particularly described and ascertained the nature of the invention and in what manner the same is to be performed, I declare that what I claim is:—

1. The process of producing high yields of gluconic acid by fermentation comprising the inoculation with one of the acid resistant acetic acid bacteria of the group consisting of *Bact. Hoshigaki* var. *rosea* and *Bact. industrium* var. *Hoshigaki* of an aqueous solution of material selected from the group consisting of hexoses and hexatomic alcohols.

2. The process of producing high yields of gluconic acid by fermentation comprising the inoculation with one of the acid resistant acetic acid bacteria of the group consisting of *Bact. Hoshigaki* var. *rosea* and *Bact. industrium* var. *Hoshigaki* of an aqueous solution of material selected from the group consisting of hexoses and hexatomic alcohols, in the presence of nutrients selected from the group consisting of soya bean and rice-bran extracts.

3. The process of producing high yields of gluconic acid by fermentation comprising the inoculation with one of the acid resistant acetic acid bacteria of the group consisting of *Bact. Hoshigaki* var. *rosea* and *Bact. industrium* var. *Hoshigaki* of an aqueous solution of mannite.

4. The process of producing high yields of gluconic acid by fermentation comprising the inoculation with one of the acid resistant acetic acid bacteria of the group consisting of *Bact. Hoshigaki* var. *rosea* and *Bact. industrium* var. *Hoshigaki* of an aqueous solution of glucose.

5. The process of producing high yields of gluconic acid comprising the fermentation of sugar-containing fruits with one of the acetic acid bacteria of the group consisting of *Bact. Hoshigaki* var. *rosea* and *Bact. industrium* var. *Hoshigaki*.

TEIZO TAKAHASHI.